United States Patent
Brand

(10) Patent No.: US 10,574,753 B2
(45) Date of Patent: *Feb. 25, 2020

(54) DATA FILES SYNCHRONIZATION WITH CLOUD STORAGE SERVICE

(71) Applicant: CTERA Networks, LTD., Petach-Tikva (IL)

(72) Inventor: Aron Brand, Petach-Tikva (IL)

(73) Assignee: CTERA Networks, Ltd., Petach-Tikva (IL)

( * ) Notice: Subject to any disclaimer, the term of this patent is extended or adjusted under 35 U.S.C. 154(b) by 93 days.

This patent is subject to a terminal disclaimer.

(21) Appl. No.: 15/463,433

(22) Filed: Mar. 20, 2017

(65) Prior Publication Data

US 2017/0195417 A1 Jul. 6, 2017

Related U.S. Application Data

(63) Continuation of application No. 12/641,559, filed on Dec. 18, 2009, now Pat. No. 9,614,924.

(60) Provisional application No. 61/140,071, filed on Dec. 22, 2008.

(51) Int. Cl.
| | | |
|---|---|---|
| H04L 29/08 | (2006.01) | |
| G06F 16/178 | (2019.01) | |
| H04L 9/06 | (2006.01) | |
| H04L 9/32 | (2006.01) | |
| H04L 29/06 | (2006.01) | |

(52) U.S. Cl.
CPC ........ *H04L 67/1097* (2013.01); *G06F 16/178* (2019.01); *H04L 9/0618* (2013.01); *H04L 9/3242* (2013.01); *H04L 67/1095* (2013.01); *H04L 67/2842* (2013.01); *H04L 69/04* (2013.01)

(58) Field of Classification Search
CPC ............ H04L 67/1095; H04L 67/1097; H04L 67/2842; H04L 9/0618; H04L 9/3242; H04L 69/04
See application file for complete search history.

(56) References Cited

U.S. PATENT DOCUMENTS

| | | |
|---|---|---|
| 6,470,329 B1 * | 10/2002 | Livschitz .......... G06F 17/30949 |
| 7,113,963 B1 | 9/2006 | McCaw |
| 7,203,796 B1 | 4/2007 | Muppalaneni et al. |
| 7,325,145 B1 | 1/2008 | England |
| 7,430,639 B1 | 9/2008 | Bali et al. |
| 7,596,620 B1 | 9/2009 | Colton et al. |
| 7,752,180 B1 | 7/2010 | Fair et al. |
| 7,865,663 B1 | 1/2011 | Nelson et al. |
| 8,127,358 B1 | 2/2012 | Lee |
| 8,135,683 B2 | 3/2012 | Douglis et al. |
| 8,595,847 B2 | 11/2013 | Petta et al. |

(Continued)

*Primary Examiner* — Viet D Vu
(74) *Attorney, Agent, or Firm* — M&B IP Analysts, LLC

(57) ABSTRACT

A method for synchronizing data files between a client device and a cloud storage service (CSS). The method comprises marking each data file that has been changed since a last synchronization between the client device and the CSS; dividing each marked data file into a plurality of blocks; assigning each block with a unique code; determining, based on the assigned the unique codes, a set of modified blocks from among the plurality of blocks; and synchronizing the set of modified blocks such that the CSS and the client device include a consistent version of each data file that has changed.

14 Claims, 6 Drawing Sheets

(56) References Cited

U.S. PATENT DOCUMENTS

| | | |
|---|---|---|
| 2002/0095598 A1 | 7/2002 | Camble et al. |
| 2003/0074574 A1 | 4/2003 | Hursey et al. |
| 2004/0039889 A1 | 2/2004 | Elder et al. |
| 2004/0054891 A1 | 3/2004 | Hengeveld et al. |
| 2004/0098539 A1 | 5/2004 | Frank |
| 2004/0143713 A1 | 7/2004 | Niles et al. |
| 2005/0071586 A1* | 3/2005 | Bartfai ............... G06F 12/0826 711/162 |
| 2005/0097225 A1 | 5/2005 | Glatt et al. |
| 2006/0010154 A1 | 1/2006 | Prahlad et al. |
| 2006/0230076 A1 | 10/2006 | Gounares et al. |
| 2006/0230245 A1 | 10/2006 | Gounares et al. |
| 2006/0239275 A1 | 10/2006 | Zlateff et al. |
| 2007/0143589 A1 | 6/2007 | Rawe et al. |
| 2007/0162510 A1 | 7/2007 | Lenzmeier et al. |
| 2007/0250593 A1 | 10/2007 | Sikdar et al. |
| 2008/0005168 A1 | 1/2008 | Huff et al. |
| 2008/0040420 A1 | 2/2008 | Twiss et al. |
| 2008/0080552 A1 | 4/2008 | Gates et al. |
| 2008/0288301 A1 | 11/2008 | Emling et al. |
| 2008/0289006 A1 | 11/2008 | Hock et al. |
| 2008/0317068 A1 | 12/2008 | Sagar et al. |
| 2009/0006792 A1 | 1/2009 | Federwisch et al. |
| 2009/0006869 A1 | 1/2009 | Satya |
| 2009/0007234 A1 | 1/2009 | Birger et al. |
| 2009/0031212 A1 | 1/2009 | Hsu |
| 2009/0070533 A1 | 3/2009 | Elazary et al. |
| 2009/0144422 A1 | 6/2009 | Chatley et al. |
| 2009/0248693 A1 | 10/2009 | Sagar et al. |
| 2009/0288169 A1 | 11/2009 | Petta et al. |
| 2009/0300169 A1* | 12/2009 | Sagar .................... H04L 41/00 709/224 |
| 2010/0042720 A1 | 2/2010 | Stienhans et al. |
| 2010/0088150 A1 | 4/2010 | Mazhar et al. |
| 2010/0149096 A1 | 6/2010 | Migos et al. |
| 2010/0274982 A1 | 10/2010 | Mehr et al. |
| 2010/0318632 A1 | 12/2010 | Yoo et al. |
| 2010/0332401 A1 | 12/2010 | Prahlad et al. |
| 2010/0332588 A1 | 12/2010 | Schwimer |
| 2013/0204849 A1 | 8/2013 | Chacko |
| 2014/0082131 A1 | 3/2014 | Jagtap |
| 2014/0082156 A1 | 3/2014 | Jagtap |

* cited by examiner

DATA FILES SYNCHRONIZATION WITH CLOUD STORAGE SERVICE

CROSS REFERENCE TO RELATED APPLICATIONS

This application is a continuation application of U.S. patent Ser. No. 12/641,559, filed on Dec. 18, 2009, now U.S. Pat. No. 9,614,924 which claims the benefit of U.S. Provisional Application No. 61/140,071 filed on Dec. 22, 2008, the contents of which are herein incorporated by reference.

TECHNICAL FIELD

The disclosure relates generally to storage networks, and more particularly to integrated local and cloud storage services.

BACKGROUND

The demand for storage has been rapidly increasing, as the amount of data such as digital media stored by users grows, so does their need to store digital media reliably over extended periods of time. Traditional, backup solutions periodically copy data to, for example, backup tapes, compact discs (CDs), or other local storage media. However, such solutions are not optimal as the backup media is stored in a single location and media used for backup are prone to failure.

Other solutions include storing data files on a local hard-drive of a personal computer (PC) and synchronizing the data remotely using hosted storage services. Having a remote backup ensures data is stored in multiple locations, and be protected local disasters, such as fires or floods. However, such solutions require installation of special client software on each individual PC, which is prone to software incompatibilities, lack of central control, and high deployment cost.

Commercially available services referred to as cloud storage services provide mass storage through a web service interface available through the Internet. FIG. 1 illustrates a storage system 100 designed to provide cloud storage services. The system 100 includes a distributed array of geographically distributed data centers 110-1 to 110-M connected to a plurality of clients 120-1 to 120-N through a wide area network (WAN) 130.

A data center 110 typically consists of servers and mass storage facilitating cloud storage services to the clients 120. Such services enable applications including, for example, backup and restore of data, data migration, data sharing, data collaboration, and so on. Cloud storage services are accessible from anywhere in the world. To this end, each client 120 implements a web services interface designed to at least synchronize data with the data centers 110. Applications enabled by the cloud storage services are not aware of the specifics of the services and the underlying data synchronization operations. The disadvantage of commercially available cloud storage services is that such services do not implement standard file sharing protocols (e.g., common internet file system (CIFS) or network file system (NFS)). Furthermore, accessing files stored in the cloud storage is typically slower than accessing files stored in local storage devices.

A network-attached storage (NAS) device is a self-contained appliance connected to a network with a primary purpose of supplying file-based data storage services to clients on the network. Specifically, a NAS device provides the functionality of data storage, file-based operations (e.g., read, write, delete, modify, etc.), and the management of these functionalities. However, commercially available NAS devices do not operate in conjunction with cloud storage services. Therefore, organizations and businesses utilizing NAS devices to store and manage their data cannot benefit from mass storage and applications of cloud storage services.

It would be therefore advantageous to provide a solution for integrating NAS devices with cloud storage services.

SUMMARY

Certain embodiments disclosed herein include a method for synchronizing data files between a client device and a cloud storage service (CSS). The method comprises marking each data file that has been changed since a last synchronization between the client device and the CSS; dividing each marked data file into a plurality of blocks; assigning each block with a unique code; determining, based on the assigned the unique codes, a set of modified blocks from among the plurality of blocks; and synchronizing the set of modified blocks such that the CSS and the client device include a consistent version of each data file that has changed.

Certain embodiments disclosed herein also include method for storing, in a cloud storage service (CSS), data files that are locally stored in a client device. The method comprises dividing each data file into a plurality of blocks; assigning each block of the plurality of blocks with a unique code; determining, based on the unique codes, at least one block that is not stored in the CSS; and transmitting the determined at least one block to the CSS to be stored in the CSS, thereby maintaining at least one consistent version of each data file.

Certain embodiments disclosed herein also include a system for storing data files in a cloud storage service (CSS). The system comprises storage configure to store a plurality of data files; a processor; and a memory, the memory containing instructions that, when executed by the processor, configure the system to: for each data file of the plurality of data files locally stored in the storage: divide the data file into a plurality of blocks; assign each block of the plurality of blocks with a unique code; determine, based on the unique codes, at least one block that is not stored in the CSS; and transmit the at least one block to the CSS to be stored in the CSS, thereby maintaining at least one consistent version of the data file.

BRIEF DESCRIPTION OF THE DRAWINGS

The subject matter disclosed herein is particularly pointed out and distinctly claimed in the claims at the conclusion of the specification. The foregoing and other features and advantages of the will be apparent from the following detailed description taken in conjunction with the accompanying drawings.

DETAILED DESCRIPTION

Figure 1:
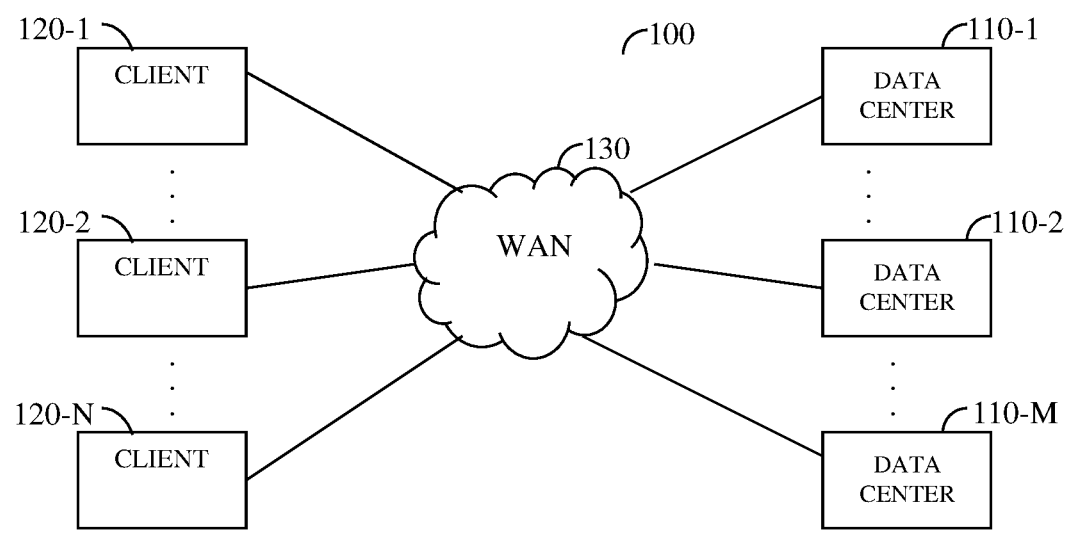
FIG. 1 is a diagram of a storage network system.

It is important to note that the embodiments disclosed are only examples of the many advantageous uses of the innovative teachings herein. In general, statements made in the specification of the present disclosure do not necessarily limit any of the various claimed embodiments. Moreover, some statements may apply to some inventive features but not to others. In general, unless otherwise indicated, singular elements may be in plural and vice versa with no loss of generality. In the drawings, like numerals refer to like parts through several views.

Figure 2:
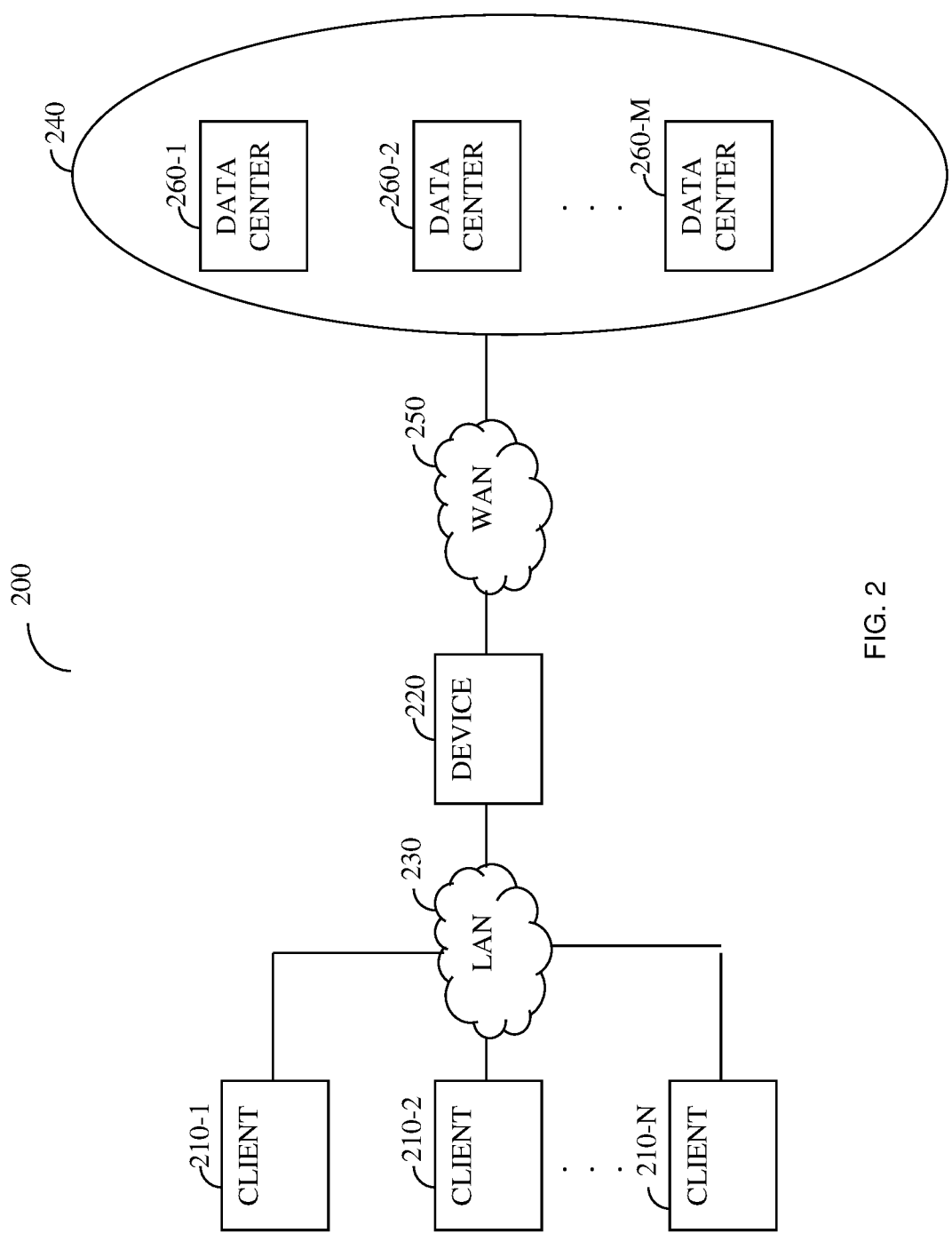
FIG. 2 is a storage network system useful in describing the various disclosed embodiments.

FIG. 2 shows an exemplary and non-limiting diagram of a storage network system 200 utilized to describe some of the disclosed embodiments. The system 200 includes clients 210-1 to 210-N (generally referred to as client or clients 210) connected to a device 220 through a local area network (LAN) 230 which may be either a wireless or wired network. The clients 210 can perform file-based operations on the device 220 by using any type of a file sharing protocol including, but not limited to, a network file system (NFS), a common internet file system (CIFS), and the like. In addition, the device 220 is connected to data centers 260-1 to 260-M through a network 250 which may be the Internet or a wide area network (WAN). The data centers 260 may be geographically distributed and implement a cloud storage service (CSS) 240 constructed in accordance with an embodiment.

Figure 3:
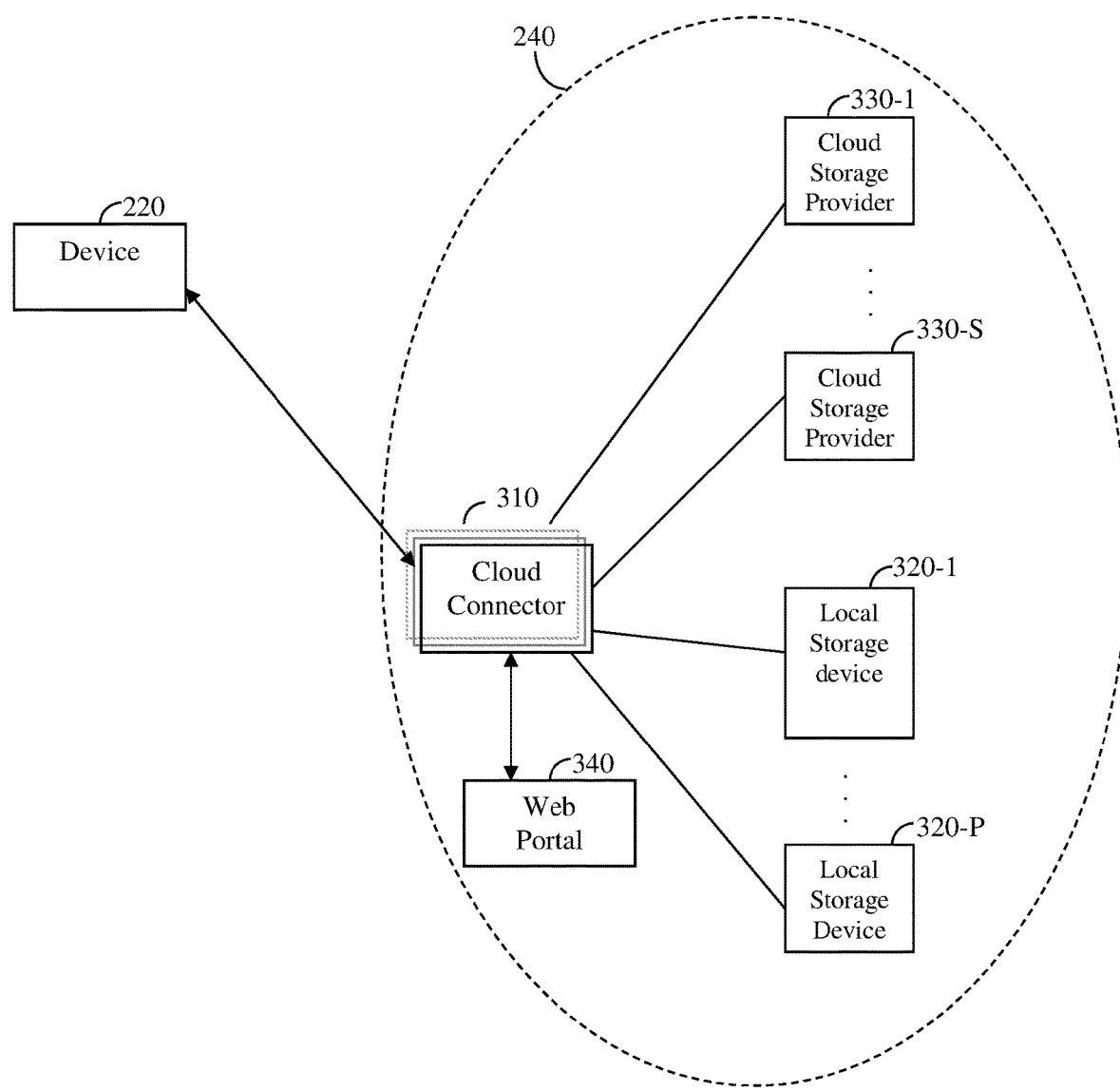
FIG. 3 is a cloud storage service (CSS) constructed in accordance with an embodiment.

As illustrated in FIG. 3 the CSS 240 consists of a plurality of cloud connectors 310 that facilitate connections between the device 220 and storage devices 320-1 to 320-P (e.g., disk drives and/or SAN/NAS devices) as well as connections to third parties cloud storage providers 330-1 to 330-S (e.g., Amazon Web Services, Nirvanix, etc.). The cloud connectors 310 operate in parallel to enable load balancing and to avoid a single point of failure. In one embodiment, the web portal 340 is also provided to enable users to perform at least file-based operations on files stored in the CSS 240 using a web-base interface. In accordance with one embodiment local storage devices 320-1 to 320-P are administratively organized in device groups (DGs), each DG contains one or more devices, and when block encryption is used, DGs share the same block encryption key.

According to certain embodiments, in order to allow transparent access from clients 210 to files stored in the CSS 240, the device 220 provides a shared network folder (hereinafter the "virtual cloud drive" (VCD)). The VCD exposes files that are stored at the CSS 240. When a client 210 tries to access a specific byte range from a VCD of the device 220 that is mapped to the CSS 240, the device 220 transparently contacts the CSS 240 and requests the blocks including the requested byte range on behalf of the client 210. The blocks are then reassembled, decrypted and decompressed as needed, to recover the original byte range. The reconstructed byte range is then returned to the client 210. To the client 210, the file appears to be stored locally on the device 220. The device 220 may cache recently and/or frequently accessed data blocks in the memory 460 or and/or the storage 450. Such blocks can be returned directly from the cache instead of from the CSS 240.

Figure 4:
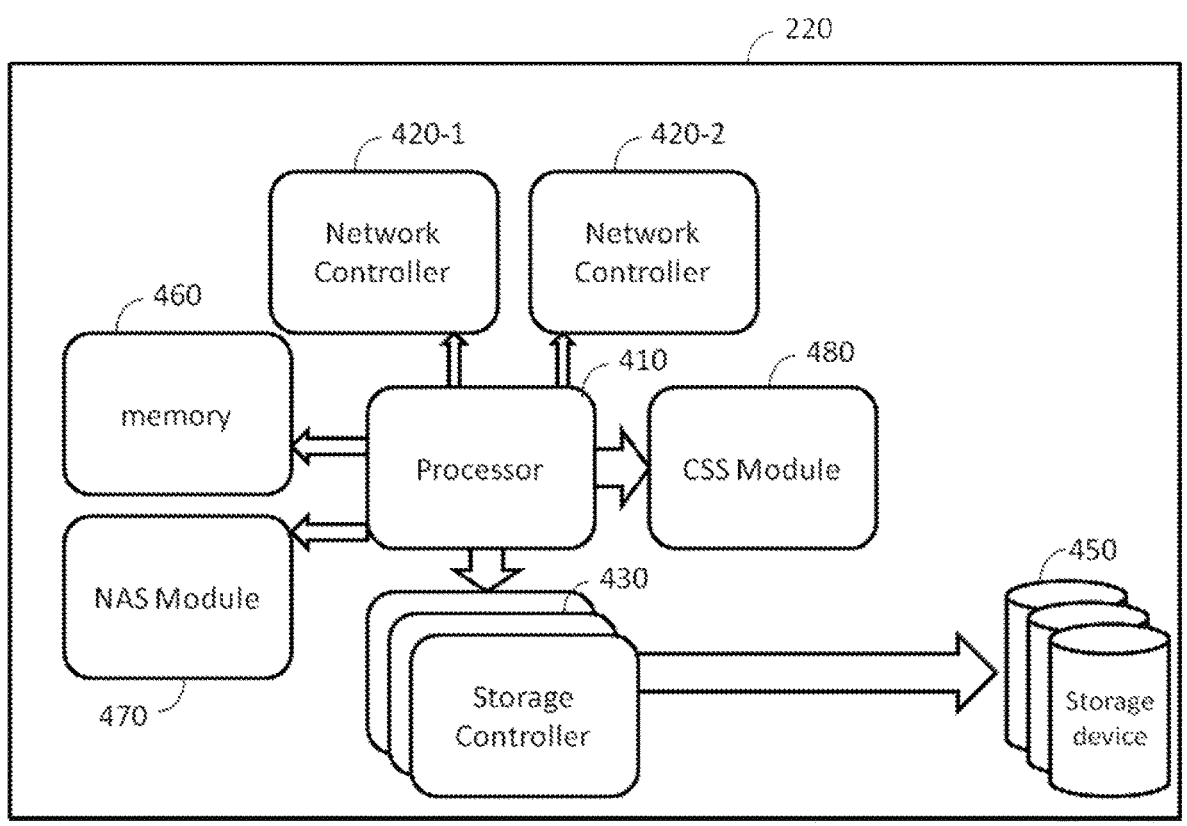
FIG. 4 is an exemplary and non-limiting block diagram of a device constructed in accordance with an embodiment.

FIG. 4 shows an exemplary and non-limiting block diagram of the device 220 constructed in accordance with an embodiment of the invention. The device 220 comprises a processor 410, network controllers 420-1 and 420-2 for interfacing with at least the LAN 230 and network 250, a plurality of storage controllers 430 for controlling storage devices 450 attached to the device 220, and non-volatile memory 460 for at least storing settings and configuration parameters required for the proper operation of the device 220. The memory 460 may be utilized to cache data transferred between the storage devices 450 and CSS 240. The memory 460 may also include software code executable by the processor 410. In certain embodiments, the communication with the networks 230 and 250 may be achieved using a single network controller.

The device 220 further includes a NAS module 470 emulating the device 220 as a NAS device and a CSS module 480 allowing the integration of the device 220 with the CSS 240. In accordance with an embodiment of the invention, the processor 410 runs an operating system (not shown) adapted to provide file-based operations on the CSS and further to control the operation of the modules 470 and 480. The storage controllers 430 include, but are not limited to, a small computer system interface (SCSI), a serial advanced technology attachment (SATA), a universal serial bus (USB), a fibre channel (FC), a serial attached SCSI (SAS), and the like. In certain embodiments, the storage devices 450 may be external to the device 220.

One of the primary tasks of the CSS module 480 is to periodically synchronize data between the device 220 (i.e., data stored in the storage devices 450) and the CSS 240. The synchronization may be in the direction from the device 220 and the CSS 240 (hereinafter "the outgoing direction"), in the direction from the CSS 240 to the device 220 (hereinafter "the incoming direction"), or simultaneously in both directions. It should be noted that all files or a partial subset of the files can be synchronized.

Synchronization in the outgoing direction is typically used as a data backup mechanism, allowing files to be backed up to the CSS 240 for safekeeping. Synchronization in the incoming direction is typically used as a data distribution mechanism, allowing files to be distributed from the CSS 240 for fast local access at the device 220 to provide fast and reliable local access to a set of files. Synchronization in both directions (bidirectional) is used to maintain data consistency between the device 220 and CSS 240. This allows to files to be modified or created both in the device 220 (through a filing sharing protocol) or the CSS 240 (through the web portal 340). It should be noted that in certain embodiments when using bidirectional synchronization one or more devices 220 can be optionally synchronized to a single location in the CSS 240. This enables multiple devices 220 to synchronize with each other through the CSS 240 which acts as a mediator.

Figure 5:
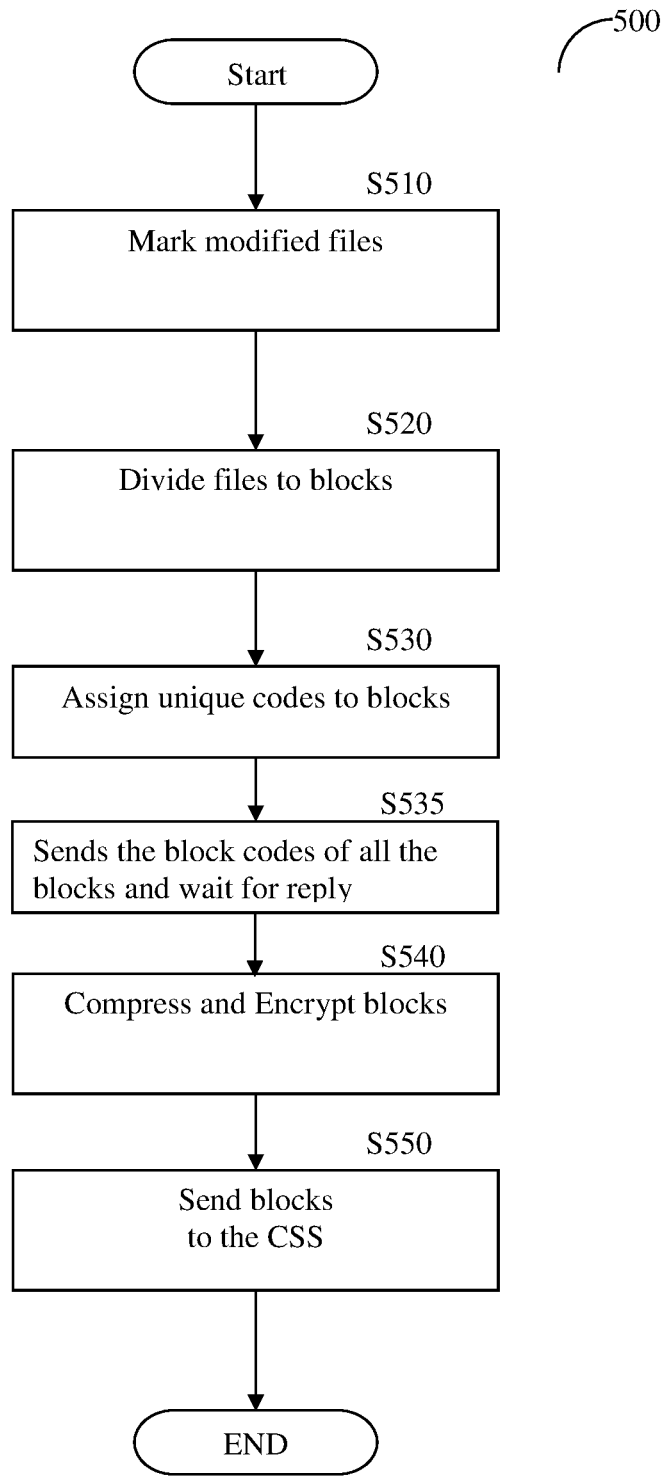
FIG. 5 is an exemplary flowchart describing the process for data synchronization implemented in accordance with an embodiment.

FIG. 5 is an exemplary flowchart 500 describing the process for data synchronization implemented in accordance with an embodiment of the invention. The process will be described with a reference to a specific embodiment where the synchronization is performed in the outgoing direction. However, one of ordinary skill in the art can easily adapt the process 500 for synchronization of data in the ingoing or bidirectional directions.

At S510, files stored either in the device 220 or CSS 240 that have been changed since the last synchronization are marked. At S520, each marked file is divided into variable size blocks. At S530, each block is assigned with a unique code using, for example, a message digest code function. Thus, each block is addressed by its unique code. In accordance with an embodiment of the invention, steps S510, S520, and S530 can be executed concurrently in a pipelined fashion rather than sequentially, to provide higher efficiency.

Thereafter, it is determined which of the data blocks have been modified. With this aim, at S535, the device 220 sends the block codes of all the blocks in a file to the CSS 240, which checks whether a block with the same code exists on the scope of the same DG. If a block with the same code already exists on the CSS 240 in the same DG, then the block does not need to be transmitted. In an embodiment of the invention, the device 220 sends to the CSS 240 the block codes of all the blocks in each file. The CSS 240 then replies with a compact run length encoded (RLE) list of the blocks which are missing on the CSS and should be transferred.

The CSS 240 maintains a reference count for each block, which is increased by 1 for each file that uses this block. When a file is deleted from the CSS 240, the reference count of all the blocks of this file is reduced by 1. When the reference count of a block reaches 0, this block is no longer used by any file and the storage space of this block may be freed. It should be appreciated that this approach results in significant storage space reduction, as multiple identical files or parts of files belonging to devices in each DG are stored only once in the CSS 240. This approach also reduces the consumption of network bandwidth, as only modified blocks are transmitted over the network 250. Furthermore, the CSS 240 can store a number of previous versions for each file, allowing the user to restore a file to an earlier version. Since the file is stored as multiple blocks, the entire file does not need to be duplicated. Rather, only the differences between file versions are stored. This reduces the required storage space for file versioning.

At S540, all modified blocks that should be sent over the network 250 may be encrypted and compressed using lossless compression algorithm, to reduce the bandwidth requirements. The encryption may be a block level encryption that uses, for example, a keyed hash cryptographic message digest code function to add an authentication code to each block. In many cases the operator of the CSS is not considered a trusted party by the device owner. Thus, the encryption key can be known only to the owner of the device 220, thereby preventing even the operator of the CSS 240 from viewing or altering the contents of the stored files.

At S550 all modified blocks (optionally encrypted and compressed) are transmitted from the device 220 to the CSS 240 over the network 250. It should be noted that multiple blocks are transmitted without waiting for the CSS 240 to acknowledge the reception of a previously transmitted block, thus enabling efficient utilization of high latency links.

The communication between the device 220 and CSS 240 is performed by means of a cloud transport protocol (CTP) implemented in accordance with an embodiment of the invention. The CTP is a secure, encrypted connection based on Transmission Control Protocol (TCP)/internet protocol (IP), such as secure sockets layer (SSL) or times literary supplement (TLS). This ensures confidentiality against external eavesdroppers, or malicious modification of the data in transit. The CTP also supports a message framing protocol for sending and receiving arbitrary length messages between the device 220 and CSS 240 and implements an authentication method by which the device 220 authenticates to the CSS 240, for example, by using a security certificate (asymmetric key), or by means of a symmetric secret key or password. The CSS 240 authenticates to the device 220 by, for example, using a security certificate (asymmetric key), thus preventing an attacker from impersonating the CSS 240.

In addition to synchronizing files with the local storage available on the device 220, the CSS 240 can be utilized to expand the amount of local storage on the device 220. With this aim, the CSS 240 is exposed on the device 220 as an extended storage space in the device 220. This ability allows the device 220 to have capacities of mass storage systems (i.e., practically infinite storage space), specifically, allowing small NAS like devices to have storage space of mass storage systems. To allow access to the extended storage space as if it is on the device itself, the VCD allows read/write operations on the expanded storage space on the CSS 240.

Figure 6:
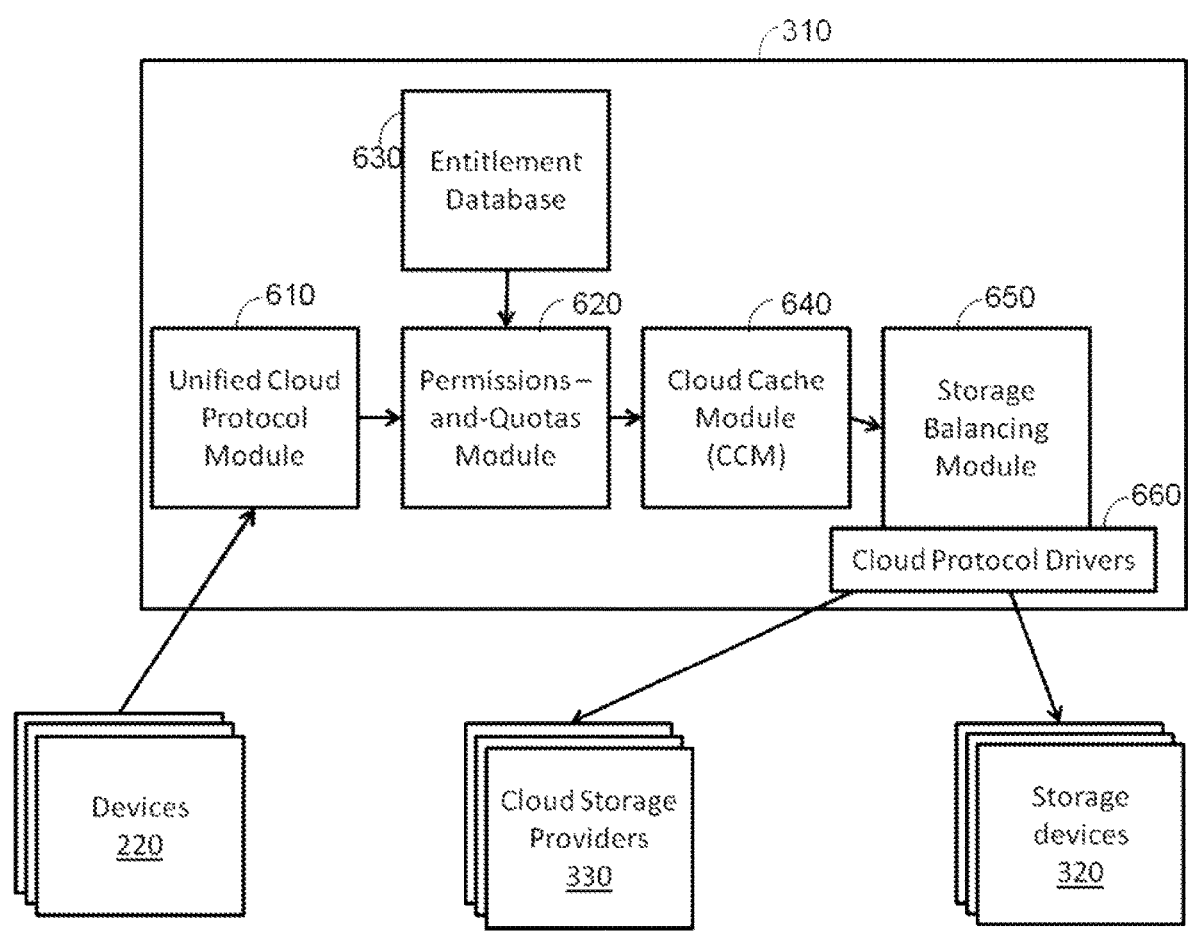
FIG. 6 is an exemplary and non-limiting block diagram of a cloud connector implemented in accordance with an embodiment.

FIG. 6 shows an exemplary and non-limiting block diagram of a cloud connector (CC) 310 implemented in accordance with an embodiment of the invention. As mentioned above one of the tasks of a cloud connector 310 is to interface between the device 220 and storage devices 320 as well as connections to cloud storage providers 330. In the current market place, there are a multitude of cloud storage service providers. However, due to a lack of a universal standard for a protocol of a cloud storage provider, most providers use proprietary interfaces and protocols. To resolve this drawback, the cloud connector 310 provides the device 220 with a unified communication protocol to access one or more cloud storage providers 330. Specifically, the cloud connector 310 acts as a gateway and translates the unified protocol, used to communicate with the device 220, to the protocols implemented by different cloud storage providers 330. It should be appreciated that this approach reduces the complexity of the device implementation, as the device 220 is not required to communicate directly with the various cloud storage providers. This approach further allows adding new cloud storage providers without modifying the device 220 or the clients 210. In addition to providing a unified interface to cloud storage providers 330, the cloud connector 310 can provide the same interface for the storage devices 320.

The cloud connector 310 includes a unified cloud protocol module 610 for communicating with the device 220 by means of the cloud transport protocol described above. The cloud connector 310 also includes a permissions-and-quotas enforcement module 620, a service entitlement database 630, a cloud cache module (CCM) 640, a storage balancing module 650, and one or more cloud protocol drivers 660 for interfacing with storage devices and cloud storage providers in the CSS 240.

The storage balancing module 650 performs load balancing between multiple cloud storage providers and possibly multiple local storage devices 330 based on criteria including, but not restricted to, performance, cost and reliability. For example, a simplistic balancing scheme could be to store 20 percent of the data to a storage device 320, and 80 percent to a cloud storage provider 330. The split between the cloud storage providers 330 can be either static (for example, according to the block code) or dynamic (for example, based on the current cost and availability of each cloud storage provider).

The CCM 640 may cache recently used or frequently accessed data blocks locally, for reduction in communication costs to the cloud storage providers and reduced latency.

The permissions-and-quota module 610 enforces and restricts devices 220 access to data blocks according to a list of access control rules. The module 610 can also enforce storage quotas for each device 220 and provide differentiated service levels per customer. The entitlement database 630 is used to store the service level agreement (SLA) for each of the customers, having accesses through clients 210, subscribed to the third party cloud storage services 330. When a customer connects the CSS 240, the entitlement database 630 is accessed to check whether the customer is entitled to the requested service. In addition, the entitlement database 630 contains additional service level information, such as storage and bandwidth quotas for each customer. It should be appreciated that the invention described herein provides a storage solution that combines the speed and practicality of NAS devices on the local network, with the scalability and disaster protection of cloud storage services.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware, and software. Moreover, the software is preferably implemented as an application program tangibly embodied on a program storage unit or computer readable medium. One of ordinary skill in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

In addition, certain embodiments of the invention may be implemented in software and/or firmware are tangibly embodied on the device 220 either by the preferable means of non volatile flash memory or, less preferably, on the hard drives attached to the device.

What is claimed is:

1. A method for synchronizing data files between a client device and a cloud storage service (CSS), comprising:
    marking each data file that has been changed since a last synchronization between the client device and the CSS, the marking being done in response to a determination that the file has changed that is made without use of communication between the client device and the CSS;
    dividing each marked data file into a plurality of blocks;
    assigning each block with a unique code;
    determining, based on the assigned the unique codes, a set of modified blocks from among the plurality of blocks;
    synchronizing the set of modified blocks such that the CSS and the client device include a consistent version of each data file that has changed; and
    pipelining execution of: dividing the file into the plurality of blocks, and assigning each block with the unique code.

2. The method of claim 1, wherein determining the set of modified blocks further comprises:
    sending a list of the unique codes to the CSS; and
    receiving, from the CSS, a subset of the list of unique codes, wherein the subset includes codes of the list of unique codes that are missing from the CSS.

3. The method of claim 2 wherein the list of the unique codes is included in a file map designating at least a sequence of block codes of all of the plurality of blocks in any one of: a data file and a byte range of the data file.

4. The method of claim 1, further comprising at least one of
    compressing the modified blocks; and
    encrypting the modified blocks.

5. The method of claim 1, wherein assigning each block with a unique code further comprises:
    calculating a message digest function of the block.

6. The method of claim 1, wherein transmitting the modified blocks further comprises: using a cloud transport protocol (CTP).

7. The method of claim 1, wherein synchronizing the modified blocks is performed in at least one of: from the client device to the CSS, and from the CSS to the client device.

8. The method of claim 1, wherein the synchronization of data files is between a plurality of client devices and the CSS, wherein least one data file is shared among the plurality of client devices.

9. The method of claim 1, wherein the client device is at least a network attached storage.

10. The method of claim 9, wherein the client device and the CSS are geographically distributed from each other.

11. A non-transitory computer readable medium having stored thereon instructions for causing one or more processors to perform a process for synchronizing data files between a client device and a cloud storage service (CSS), the process comprising:
    marking each data file that has been changed since a last synchronization between the client device and the CSS, the marking being done in response to a determination that the file has changed that is made without use of communication between the client device and the CSS;
    dividing each marked data file into a plurality of blocks;
    assigning each block with a unique code;
    determining, based on the assigned the unique codes, a set of modified blocks from among the plurality of blocks;
    synchronizing the set of modified blocks such that the CSS and the client device include a consistent version of each data file that has changed; and
    pipelining execution of: dividing the file into the plurality of blocks, and assigning each block with the unique code.

12. The method of claim 1, wherein the client device is at least a network attached storage.

13. The method of claim 9, wherein the client device and the CSS are geographically distributed from each other.

14. A system for storing data files in a cloud storage service (CSS), comprising:
    storage configured to store a plurality of data files;
    a processor; and
    a memory, the memory containing instructions that, when executed by the processor, configure the system to:
    for each data file of the plurality of data files locally stored in the storage:
        mark each data file that has been changed since a last synchronization between the client device and the CSS, the marking being done in response to a determination that the file has changed that is made without use of communication between the client device and the CSS;

divide the data file into a plurality of blocks;

assign each block of the plurality of blocks with a unique code;

determine, based on the unique codes, at least one block that is not stored in a same device group in the CSS;

transmit the at least one block to the CSS to be stored in the CSS, thereby maintaining at least one consistent version of the data file; and pipelining execution of: dividing the data file into the plurality of blocks, and assigning each block of the plurality of blocks with the unique code.

* * * * *